United States Patent
Walthall

(10) Patent No.: US 6,950,713 B2
(45) Date of Patent: Sep. 27, 2005

(54) METHOD FOR CREATING A THREE-DIMENSIONAL ENGRAVING IN A SOLID AND A PRODUCT CREATED BY SAID METHOD

(75) Inventor: Jim Walthall, Danville, IL (US)

(73) Assignee: Greenwood, Inc., Danville, IL (US)

( * ) Notice: Subject to any disclaimer, the term of this patent is extended or adjusted under 35 U.S.C. 154(b) by 75 days.

(21) Appl. No.: 10/630,055

(22) Filed: Jul. 30, 2003

(65) Prior Publication Data

US 2005/0038547 A1 Feb. 17, 2005

(51) Int. Cl.[7] .............................................. G06F 19/00
(52) U.S. Cl. ........................................ 700/98; 700/118
(58) Field of Search ............................ 700/98, 118, 172, 700/182, 120; 269/54.2

(56) References Cited

U.S. PATENT DOCUMENTS

| | | | |
|---|---|---|---|
| 3,857,025 A | 12/1974 | English | 235/151.11 |
| 4,020,610 A | 5/1977 | Alexander | 52/511 |
| 4,063,346 A | 12/1977 | Simpson | 29/527.7 |
| 4,254,544 A | 3/1981 | Barker | 29/527.3 |
| 4,304,076 A | 12/1981 | Splendora | 52/104 |
| 4,553,334 A * | 11/1985 | Fell | 33/628 |
| 4,875,966 A * | 10/1989 | Perko | 156/580 |
| 5,064,321 A * | 11/1991 | Barnes | 409/219 |
| 5,477,023 A | 12/1995 | Schneider | 219/121.68 |
| 5,569,003 A | 10/1996 | Goldman | 409/132 |
| 5,575,099 A * | 11/1996 | Strobel et al. | 40/584 |
| 5,714,367 A | 2/1998 | Quick | 428/195 |
| 5,947,182 A * | 9/1999 | Nohara et al. | 164/417 |
| 6,063,480 A * | 5/2000 | Hokazono et al. | 428/206 |
| 6,322,636 B1 * | 11/2001 | Matsugu | 148/269 |
| 6,385,499 B1 | 5/2002 | Mattke | 700/159 |
| 6,459,952 B1 | 10/2002 | Dundorf | 700/182 |
| 2001/0044668 A1 * | 11/2001 | Kimbrough et al. | 700/118 |
| 2003/0069663 A1 | 4/2003 | Davis | 700/169 |

* cited by examiner

Primary Examiner—Jayprakash N. Gandhi
Assistant Examiner—Zoila Cabrera
(74) Attorney, Agent, or Firm—Gifford, Krass, Groh, Sorinkle, Anderson & Citkowski, P.C.

(57) ABSTRACT

A method for creating a three-dimensional engraving within a solid. A three-dimensional illustration of the solid is scanned into a numerical controller associated with a machining center. The 3D illustration is projected in the solid according to individual depths of cut. The solid is machined according to its project depths. Shading is accomplished according to depth of cut and by immersing the solid into oxide bath and successively abrasively removing a darkened coating according to depth of cut. Powder coating with a thermoset plastic, baking and curing steps provide a transparent coating to the solid.

21 Claims, 3 Drawing Sheets

METHOD FOR CREATING A THREE-DIMENSIONAL ENGRAVING IN A SOLID AND A PRODUCT CREATED BY SAID METHOD

BACKGROUND OF THE INVENTION

1. Field of the Invention

The present invention relates generally to computerized and numerically controlled engraving processes. More specifically, the present invention discloses a software based and CNC process, and product created thereby, for creating such as a bronze plaque or marker. The process and associated product created thereby includes the scanning or inputting a photograph or other suitable digitized data into a three-dimensional image processed by the CNC machine. The software associated with the CNC machine projects the 3D image into a solid for subsequent engraving and to reflect the inputted three-dimensional shape. Additional finishing steps of the engraved solid include oxide coating the same and in order to shade the three-dimensional surface of the solid and according to the depth of cut.

2. Description of the Prior Art

The prior art is well documented with various types of engraving and inscribing processes. These apply to both ferrous and non-ferrous metals, as well as to wood and other synthetics. A subset grouping of such engraving applications are directed to the creation of such as memorial grave markers and the like.

A first example of the prior art is disclosed in U.S. Pat. No. 6,385,499, issued to Mattke et al., and which teaches a computer controlled routing apparatus and method implemented by a computer controlled routing machine for generating memorial products having recessed memorial information provided therein. The method includes the steps inputting data representing memorial information into a computer, processing the inputted data to provide instructions for controlling a routing machine, and routing memorial information into a metal surface according to the instructions and in order to provide a memorial product. The inputted memorial information associated with Mattke typically includes such as handwriting, signatures, and hand, palm or foot imprints. Mattke further teaches routing such as a bronze alloy plate.

U.S. Patent Application Publication No. US 2003/0069663, to Davis, teaches a system and method for inscribing bullion articles and which includes a first processor with a display terminal and a mouse controller. A drawing program is incorporated into the hard drive of the processor and is capable of generating and displaying any one of a selection of font illustrations. The processor incorporates a program for rendering a single line art representation of the displayed font, typically through the use of the mouse to retrace a centerline of the font. The manual redrawing thus created is saved as a file in a first format and converted to a second format for subsequent transmission and execution by a numerical controller.

A specially modified milling tool is instructed by the controller to inscribe, to a selected depth, the surface of the bullion article utilizing a time saving and single pass technique. Additional elements of the system include a CNC mill, sander, polish and polishing cloths and sealant for treating and finishing the inscribed articles, such articles further including both minted and milled/inscribed faces or surfaces which have been previously minted on the face.

U.S. Pat. No. 6,459,952, issued to Dundorf, teaches a system and method for producing three-dimensional carved wood sign. A computer aided design system incorporating a three-dimensional graphical model of the signage work is provided. A desired mathematical representation is created of the three-dimensional graphical model of the signage work to be carved in the signboard and the desired mathematical representation is provided to a computer-aided machining system having a carving tool. The carving tool operates under the controlled guidance of the CAD system in order to create a three-dimensional carved pattern in the signboard corresponding to the three-dimensional graphical model.

SUMMARY OF THE PRESENT INVENTION

The present invention discloses a process for creating a three-dimensional engraving, such as upon a bronze memorial plaque. The present invention further employs a unique software based machining/engraving process and apparatus for reading and projecting/inputting a three-dimensional image into a solid (such as again a plaque by example), and prior to three-dimensional machining. Additionally, the present invention teaches a unique process of shading the machined solid in varying fashion, according to a depth of cut, and in order to accentuate the three-dimensional representation created within the machined solid.

In a first process step, a photograph (or other suitable image) is scanned or otherwise inputted, typically in a digital format, and into a software based processor and program associated with the numerically controlled machine, such further including such as an engraving machine incorporating a machining zone and multiple tool changer spindle. The picture scanned into the software program is typically then "cleaned up" digitally, such as further provided by a known software based program such as Photoshop. The "cleaning up" step involves certain inputs or changes made to the digital data to achieve a desired 3D image eventually projected into the solid (such as a ¼" thick bronze sheet) to be machined and such as to further include manipulating the height (of cut) settings.

The software program then assigns a height, such as in one preferred application ranging from a scale drawn from 0–255, and from a vertical axis, for each of a plurality of assigned pixels for a given area. In a preferred embodiment, a concentration of 200 pixels per square inch is selected and so that a fairly detailed 3D computer (solid) is created.

At this point, the 3D computer surface created is dimensioned/fitted and then projected into the bronze sheet, such as previously identified. It is again important to note that a zero vertical axis assigned to the computer image is recalibrated to an intermediate depth of the 3D solid/sheet, and in order to ensure that adequate solid material remains to support the subsequently machined surface. Again, it should be kept in mind that the image created, in addition to being drawn to signage, can also be projected onto any other 3D shaped solid to be machined, such as including urn designs, other non-memorial related signage and the like.

The actual 3D object, such as again the thicknessed and planar sheet of bronzed material (or any other suitable ferrous or non-ferrous material), is fixedly supported within the machining compartment of the CNC machining center. In a preferred application, recessed locating holes (typically 3) are formed on a back (non-machined) side of the bronze marker and such that these mate with positioned nubs located on the machining platen, and in order that the sheet is precisely located within the compartment.

Additional to the recess holes, any number of interiorly threaded and bolt attachment collars, such as typically four, can be also secured (such as by a capacitor discharge arc welding process) to the back (unmachined) side of the bronze marker, this typically occurring prior to the machining step, and so that, upon completion, the marker can be attached to a marble fascia substratum or other suitable support surface. It is also important to note that an appropriate gasket seal is employed within the machining center and for vacuum sealing the marker, or other suitable 3D object, in a suitable manner during machining.

The machining center cuts the bronze marker, based upon the code dispatched by the associated software, and according to the depth of cut determined for each pixel. In a preferred application, a first roughing cut (pass) is made in a first direction, and by which the user instructs the tool spindle to select and employ a given assortment of tool bits. This is then following by a second finishing cut (pass) in a second (such as 90° offset) direction and by which the tool spindle typically selects from a further assortment of tool bits. The machine typically selects from a range of etching/milling/routing tool bits (based upon the depth and detail of the cut to be made) and in order to complete a typical job in a machining time generally ranging from 30 minutes to several hours depending upon the complexity of the piece to be machined. It is also key to the invention that the software developed tool path follows the contour of the 3D computer image created, simultaneously in the x, y and z directions.

Upon completion of the machining cycle, the plaque (or other three-dimensional and machined solid) is removed for surface preparation (oxide coating). A first intermediate step is to remove any foreign matter from the plate, such as including tooling marks, and which can be accomplished by sand blasting/buffing/wire brushing the marker.

The plate/marker/urn/or other 3D machined ferrous/non-ferrous object is then immersed into an oxide bath where such as, in one application, for a period of time of approximately 6–7 minutes, upon which the entire marker turns completely black. The oxide bath, in combination with the varying depths of cut performed in the bronze marker during the machining stage, ultimately correlates to a color (shading) assignment for each machined location (pixel) in the finished product.

In a further step, the marker is transferred from the oxide bath to a neutralizing solution (water) and then dried. The built up oxide coating is then removed from the plaque or marker, such as by rubbing with an abrasive Scotch-Brite® pad or other suitable abrading instrument. The applied abrasive material removes the oxide coating to reveal varying shading of the bronze, this again correlating to the depth of cut previously performed per pixel and in order to create the desired three-dimensional depiction.

An exterior environmental coating, for sealing the substantially finished plaque is applied and such as may include a thermoset powder coating. The coating is applied as a powderized coating, typically white, and to both the machined and unmachined sides of the marker. In a further preferred application, such as an electrostatically charging applicating gun is employed for applying the powder in adhering fashion against the plaque.

The powder is applied white and, during subsequent heating within an oven at a specified heating time and temperature, the powder is turned transparent through heat induced and exothermic reaction. A plurality of markers, once coated, are typically supported upon racks and rolled into the oven according to a given application. Upon removal from the oven, the process is completed and the finished product is ready for shipment and final installation.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
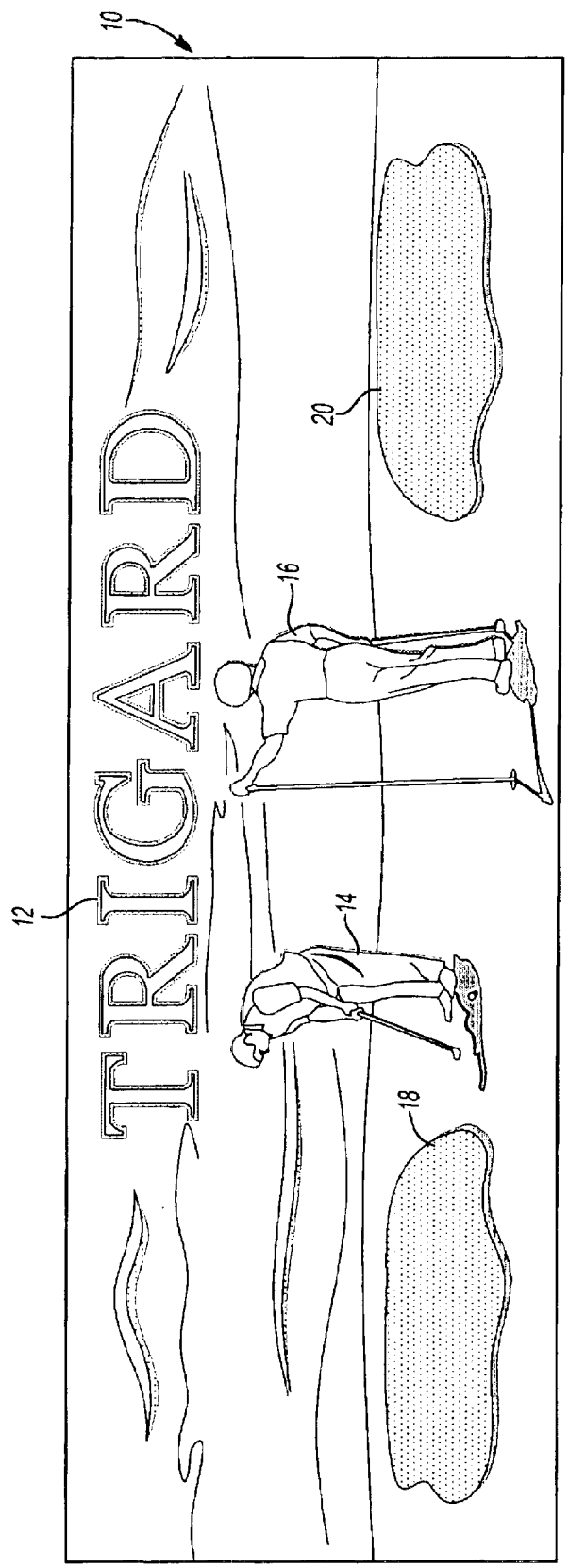
FIG. 1 is a plan view of a memorial plaque exhibiting a three-dimensional engraved surface and according to a preferred embodiment of the present invention.

Referring to FIG. 1, a memorial plaque is illustrated generally at 10 and which is produced according to the three-dimensional engraving and shading process according to the present invention. As previously explained, the present invention discloses a process for creating a three-dimensional engraving, such as upon a bronze memorial plaque. The present invention further employs a unique software based machining/engraving process and apparatus for reading and projecting/inputting a three-dimensional image into a solid (such as again a plaque by example), and prior to three-dimensional machining. Additionally, the present invention teaches a unique process of shading the machined solid in varying fashion, according to a depth of cut, and in order to accentuate the three-dimensional representation created within the machined solid.

Referring again to FIG. 1, the three-dimensional solid is illustrated, in one non-limiting example, in the form of a planar shaped plaque or marker, again at 10. The plaque, in one desired application, is provided as a sheet of bronze alloy material, such as further exhibiting a desired width, length and thickness (¼" for example). As is further understood the invention contemplates the utilization of any ferrous or non-ferrous material, or even any other suitable non-metallic material, as a three-dimensional solid for engraving. The engraving process, as will be further described in additional detail, includes the creation of both textual 12 and graphic 14, 16, 18 and 20 portions in three-dimensional fashion and within a selected face (or potentially multiple faces) of the solid 10.

Figure 2:
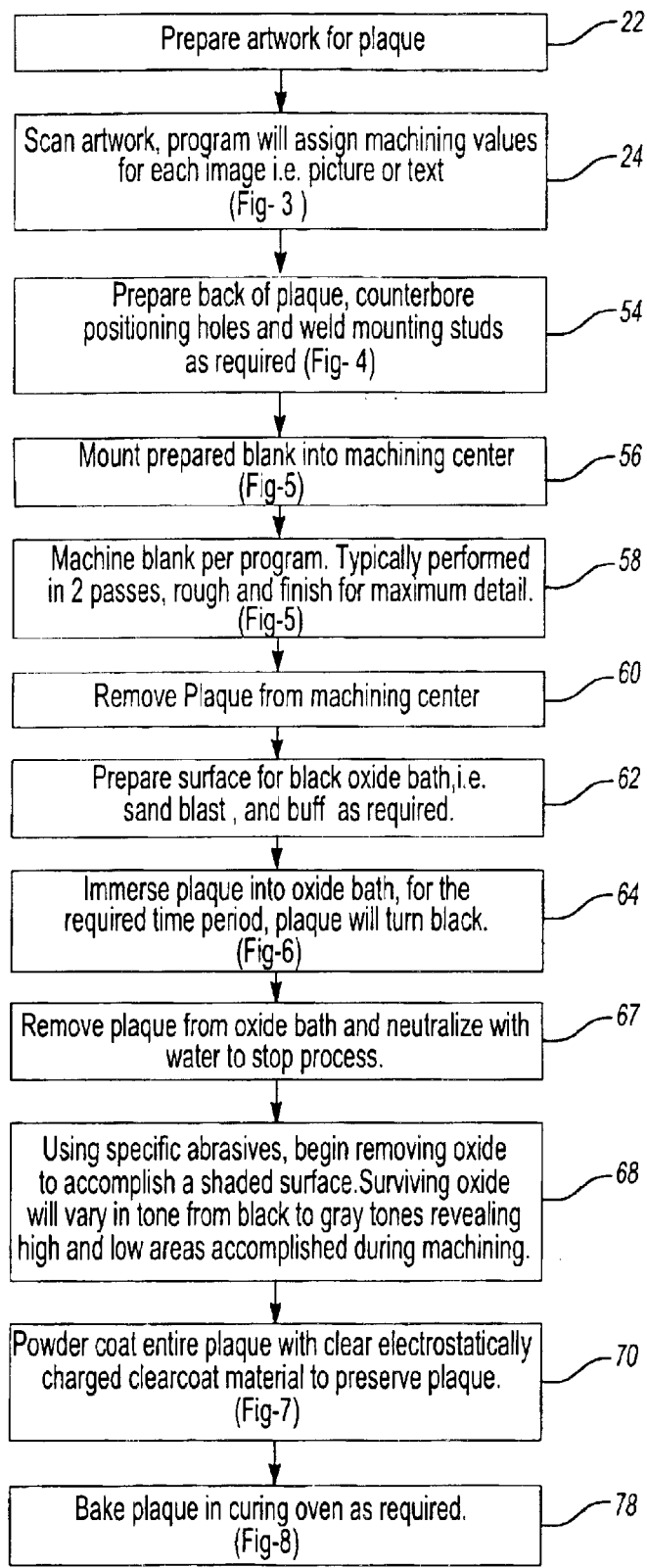
FIG. 2 is a flow schematic of the process for creating an engraved plaque according to the system and process of the present invention.

Referring now to the schematic illustration of FIG. 2, and in a first step 22, the desired artwork is prepared for engraving within the plaque 10. Along these lines, the plaque (or other suitable three-dimensional solid) is pretreated or otherwise prepared, either through the application of abrasives, chemical compositions or the like, for subsequent machining. As is further understood, the artwork (not separately illustrated) can include such as a photograph, digitally based input, or other suitable quantum of material capable of representing a three-dimensional graphical and/or textual illustration.

Figure 5:
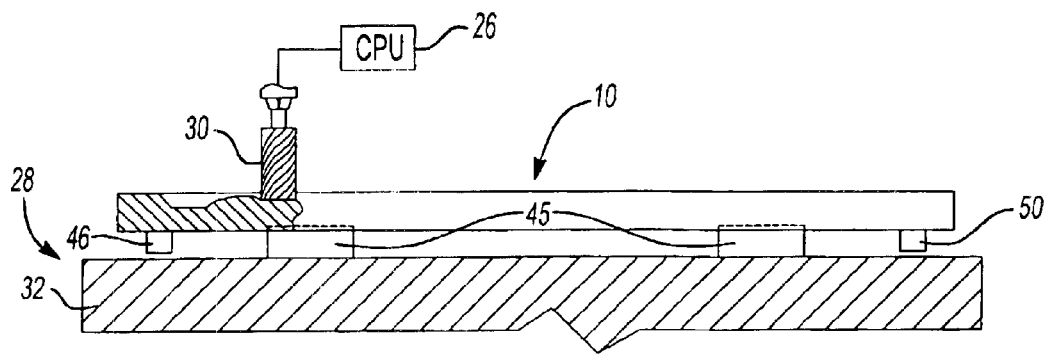
FIG. 5 is a side view illustration of an intermediate and computer numerically controlled machining process for creating the three-dimensional surface on an engraved plaque according to the present invention.

The photograph (or other suitable image) is scanned or otherwise inputted, at 24, typically in a digital format, into a software based processor and program 26 associated with a numerically controlled machine, see generally at 28 in FIG. 5. In a preferred embodiment, such further includes an engraving machine incorporating a multiple tool changing and machining spindle 30, operating within a machining zone, and which supports the solid 10 upon a platform (or platen) 32.

Referring again to step 24 in FIG. 2, it is also contemplated that the picture scanned into the software program is "cleaned up" digitally, such as further provided by a known software based program such as Photoshop. The "cleaning up" step involves certain inputs or changes made to the digital data to achieve a desired three-dimensional image eventually projected into the solid (such as a ¼" thick bronze sheet) to be machined and such as to further include manipulating the height (of cut) settings.

The software program then assigns a height, such as in one preferred application ranging from a scale drawn from 0–255, and from a vertical axis, for each of a plurality of assigned pixels for a given area. In a preferred embodiment, a concentration of 200 pixels per square inch is selected and so that a fairly detailed 3D computer (solid) is created. It is however understood that the pixel concentration and/or the depth scale can be adjusted according to the desires of the machine operator.

Figure 3:
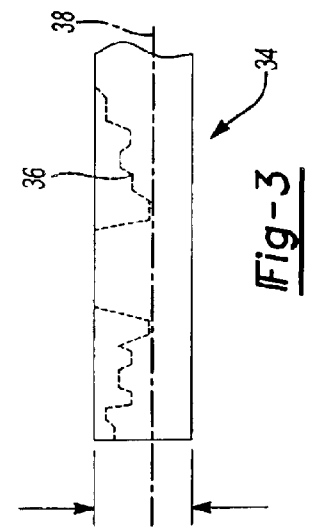
FIG. 3 is a partial side view of a plaque and illustrating, in phantom, a three-dimensional computer surface, created by the software program, and projected into the plaque prior to machining.

At this point, and referring further to the partial illustration of FIG. 3 at 34, the 3D computer surface created is dimensioned/fitted and then projected into the bronze sheet, such as represented by phantom line 36. It is again important to note that a zero vertical axis assigned to the computer image is recalibrated to an intermediate depth 38 of the 3D solid/sheet, and in order to ensure that adequate solid material remains to support the subsequently machined surface. As again previously indicated, it should be kept in mind that the image created, in addition to being drawn to signage, can also be projected onto any other 3D shaped solid to be machined, such as including urn designs, other non-memorial related signage and the like.

Figure 4:
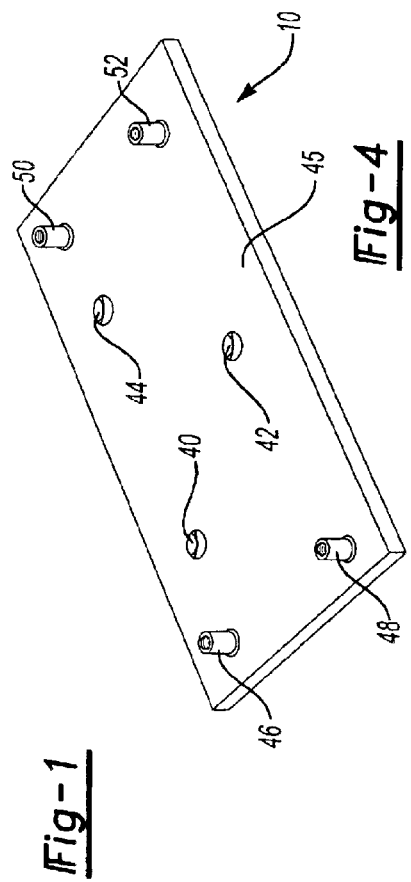
FIG. 4 is an inverted view of a plaque according to the present invention and illustrating features including a plurality of recessed holes for positioning the plaque within the machining center platform, as well as mounting studs secured to the plaque and for subsequently mounting the same to an appropriate substratum.

The actual 3D object, such as again the thicknessed and planar sheet of bronzed material (or any other suitable ferrous or non-ferrous material), is fixedly supported within the machining compartment of the CNC machining center, and such as is again represented in FIG. 5. In a preferred application, and referring to the inverted illustration of the solid 10 in FIG. 4, recessed locating holes, such as the three represented at 40, 42 and 44, are formed on a back (non-machined) side 45 of the bronze marker and such that these mate with positioned nubs (not shown) located on the machining platen 32, and in order that the sheet is precisely located within the compartment. Additionally, and although not clearly shown, it is understood that a vacuum gasket seal or the like is employed to fixedly locate the solid 10 within the machining center 28 and such is illustrated at 45 in FIG. 5.

Additional to the recess holes 40, 42 and 44, any number of interiorly threaded and bolt attachment collars, such as typically the four represented at 46, 48, 50 and 52, can be also secured, such as by welding, to the plaque. See also step 54 outlined in FIG. 2.

In a preferred application, a capacitor discharge arc welding process is employed and by which a projecting tip associated with a downwardly facing end of each stud is placed in contact with a location of the solid surface 45. At this point, an ignited arc is created and by which a relatively thin fusion zone is generated between the stud (or bolt attachment collar), and the workpiece. The collar is then lunged into the welding pool thus created and, upon solidification of the material, accomplishes welding of each of the collars 46, 48, 50 and 52. The attachment of the collars 46, 48, 50 and 52 typically occurs prior to the machining step, and so that, upon completion, the plaque 10 (or other suitable solid) can be attached to a marble fascia substratum or other suitable support surface.

Referring again to FIGS. 2 and 5 in combination, and upon the software based processor projecting the three-dimensional image into the solid in the fashion illustrated in FIG. 3. The plaque 10 is mounted in the machining center 28 (see also step 56 in FIG. 2) and the machining center 28 proceeds to cut the bronze marker or other suitable plaque 10, see further step 58, based upon the code dispatched by the associated software, and according to the depth of cut determined for each pixel.

In a preferred application, a first roughing cut (pass) is made in a first direction, and by which the user instructs the tool spindle to select and employ a given assortment of tool bits. This is then following by a second finishing cut (pass) in a second (such as 90° offset) direction and by which the tool spindle typically selects from a further assortment of tool bits. The machine typically selects from a range of etching/milling/routing tool bits, see again tool holding spindle 30 in FIG. 5, based upon the depth and detail of the cut to be made and in order to complete a typical job in a machining time generally ranging from 30 minutes to several hours depending upon the complexity of the piece to be machined. It is also an important feature of the present invention that the software developed tool path follows the contour of the 3D computer image created, simultaneously in the x, y and z directions.

Upon completion of the machining cycle, and as outlined at step 60 in FIG. 2, the plaque (or other three-dimensional and machined solid) is removed from the numerically controlled machining center 28 for surface preparation (oxide coating). A first intermediate step 62 is to remove any foreign matter from the plaque 10, such as including tooling marks, and which can be accomplished by sand blasting/buffing/wire brushing the marker.

Figure 6:
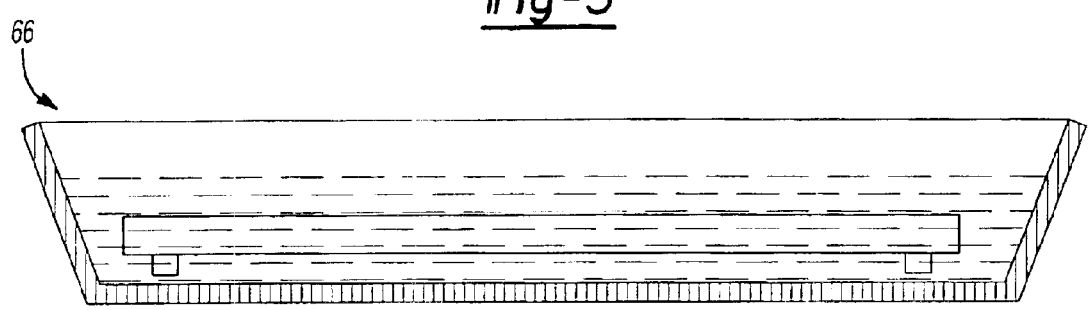
FIG. 6 is an illustration of an oxide bath utilized in combination with the plaque in a post-machining step and according to the present invention.

The plate/marker/urn/or other 3D machined ferrous/non-ferrous object 10 is then immersed into an oxide bath, see step 64 in FIG. 2 as well as general illustration 66 in FIG. 6. In one preferred application, the plaque 10 is immersed in the oxide bath for a period of approximately 6–7 minutes, over the course of which the entire marker turns completely black. The oxide bath 64, in combination with the varying depths of cut performed in the bronze marker during the machining stage, ultimately correlates to a color (shading) assignment for each machined location (pixel) in the finished product and which accentuates the three-dimensional surface created upon the plaque or marker 10.

In a further step 67 (again FIG. 2), the plaque 10 is transferred from the oxide bath to a neutralizing solution (water) and then dried. The built up oxide coating is then removed from the plaque or marker, see step 68, such as by rubbing with an abrasive Scotch-Brite® pad or other suitable abrading instrument (not shown). The applied abrasive material removes the oxide coating to reveal varying shading of the bronze, this again correlating to the depth of cut previously performed per pixel and in order to create the desired three-dimensional depiction. This is caused by the surviving oxide coating varying in tone from black to gray, and correlating to high and low areas accomplished during machining.

Figure 7:
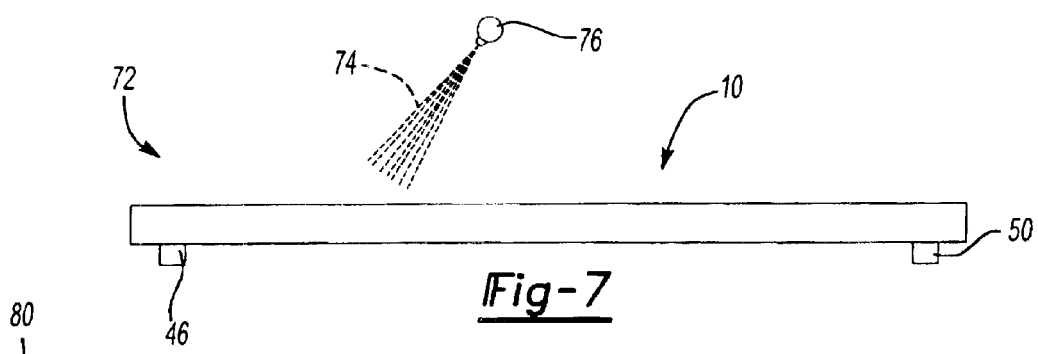
FIG. 7 is an illustration of a succeeding powder coating step applied to the engraved plaque and according to the present invention.

An exterior environmental coating, for sealing the substantially finished plaque is applied and such as may include, without limitation, a thermoset acrylic urethane, or any other suitable thermoset (powder coating) and sealing material. This step is illustrated schematically at 70 in FIG. 2 and generally at 72 in FIG. 7. The urethane is applied as a powderized coating (see at 74 in FIG. 7), typically white, and to both the machined and unmachined sides of the marker. In a further preferred application, such as an electrostatically charging applicating gun 76 is employed for applying the powder in electrostatically charged and adhering fashion against the plaque 10.

Figure 8:
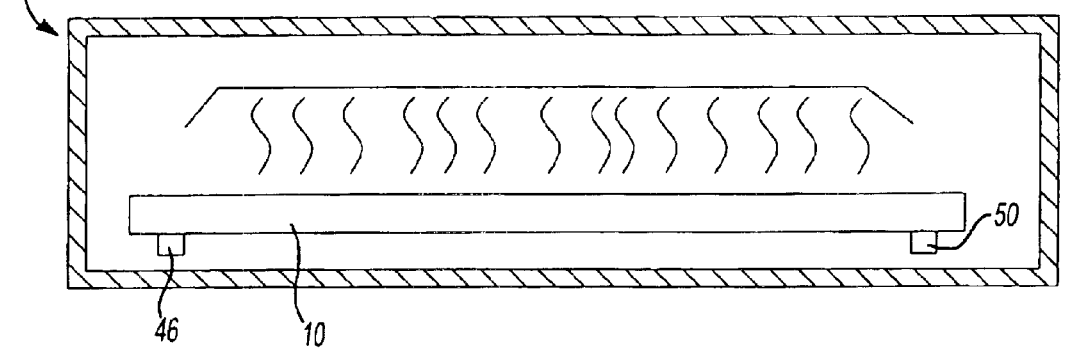
FIG. 8 is a final baking/curing step for hardening the powder coated thermoset material and according to a yet further step of the present invention.

In a preferred application, the powder is applied white and, during subsequent heating within an oven (see step 78 in FIG. 2 and generally at 80 in FIG. 8) at a specified heating time and temperature, the powder is turned transparent through heat induced and exothermic reaction. In a preferred application, a plurality of markers, once coated, are typically supported upon racks and rolled into the oven according to a given application. Upon removal from the oven, the process is completed and the finished product is ready for shipment and final installation.

Having described my invention, other and additional preferred embodiments will become apparent to those skilled in the art to which it pertains, and without deviating from the scope of the appended claims. Specifically, the engraving apparatus and process according to the present invention can be applied to machine any ferrous or nonferrous material, either extruded, rolled, forged or cast.

Additionally, it is envisioned that the software generated three-dimensional models and combined engraving processes can be employed to machine other non-metallic compositions such as potentially wood, synthetics or the like. It is still further envisioned that, additional to planar shaped plaques and markers, the three-dimensional software modeling, machining and oxide shading process of the present invention can be applied to engrave/machine such other three-dimensional articles. The include, without limitation, other types of memorial items including urns and as well as other types of signage not associated specifically with the memorial/burial community.

I claim:

1. A method for creating a three-dimensional engraving, comprising the steps of:
   providing a three-dimensional solid having a specified shape and size;
   scanning, into a processor driven and numerically controlled machining center, data corresponding to a three-dimensional illustration;
   projecting, into said solid, aid three-dimensional illustration, said step of projecting said three-dimensional illustration further comprising assigning a depth of cut per pixel distributed across a selected machining area;
   machining, in three-dimensional fashion, a three-dimensional surface within said solid corresponding to said illustration; and
   shading said three-dimensional surface of said solid according to selected depths of machining.

2. The method as described in claim 1, further comprising the step of preparing the surface of said three-dimensional solid prior to machining.

3. The method as described in claim 1, further comprising the step of forming recessed surfaces on a non-machined surface of said solid.

4. The method as described in claim 1, further comprising the step of securing fastener receiving mounting studs to a non-machined surface.

5. The method as described in claim 1, said step of projecting said three-dimensional illustration further comprising assigning a depth of cut per pixel distributed across a selected machining area.

6. The method as described in claim 1, said step of machining further comprising machining a roughing cut in a first direction, and subsequently machining a finishing cut in a second direction.

7. The method as described in claim 1, said step of shading further comprising immersing said machined three-dimensional solid within an oxide bath.

8. The method as described in claim 7, further comprising the step of applying a neutralizing solution to said solid following said step of immersing.

9. The method as described in claim 8, said step of shading further comprising abrading said three-dimensional surface and in order to remove a darkened coating resulting from said oxide bath.

10. The method as described in claim 1, further comprising the step of environmentally coating said machined solid.

11. The method as described in claim 10, said step of coating further comprising applying a powderized and thermosetting acrylic urethane material.

12. The method as described in claim 11, further comprising the step of baking said powder coated solid in an oven.

13. The method as described in claim 1, said step of machining further comprising engraving said solid.

14. A method for creating a three-dimensional engraving, comprising the steps of:
    providing a three-dimensional solid having a specified shape and size;
    scanning, into a processor driven and numerically controlled machining center, data corresponding to a three-dimensional illustration;
    projecting, into said solid, said three-dimensional illustration;
    machining, in three-dimensional fashion, a three-dimensional surface within said solid corresponding to said illustration;
    forming recessed surfaces a non-machined surface of said solid; and
    shading said three-dimensional surface of said solid according to selected depths of machining.

15. The method as described in claim 14, further comprising the step of locating said solid upon a machining center platform according to a location of said recessed surfaces.

16. A method for creating a three-dimensional engraving, comprising the steps of:
    providing a three-dimensional solid having a specified shape and size;
    scanning, into a processor driven and numerically controlled machining center, data corresponding to a three-dimensional illustration;

projecting, into said solid, a three-dimensional illustration;

machining, in three-dimensional fashion, a three-dimensional surface within said solid corresponding to said illustration;

securing fastener receiving mounting studs to a non-machined surface; and shading said three-dimensional surface of said solid according to selected depths of machining.

17. The method as described in claim 16, said step of securing studs further comprising welding incorporating a capacitor discharge arcing process.

18. A method for creating a three-dimensional engraving, comprising the steps of:

providing a three-dimensional solid having a specified shape and size;

scanning, into a process driven and numerically controlled machining center, data corresponding to a three-dimensional illustration;

projecting, into said solid, said three-dimensional illustration, said step of projecting said three-dimensional illustration further comprising assigning a depth of cut per pixel distributed across a selected machining area, aid step of assigning a depth of cut per machining area further comprising assigning at least 200 pixels per square inch of area;

machining, in three-dimensional fashion, a three-dimensional surface within said solid corresponding to said illustration; and shading said three-dimensional surface of said solid according to selected depths of machining.

19. A method for creating a three-dimensional engraving, comprising the steps of:

providing a three-dimensional solid having a specified shape and size;

scanning, into a processor driven and numerically controlled machining center, data corresponding to a three-dimensional illustration;

projecting, into said solid, said three-dimensional illustration, said step of projecting said three-dimensional illustration further comprising assigning a depth of cut per pixel distributed across a selected machining area, said step of assigning a depth of cut further comprising establishing a scale of 0–255 projected into an intermediate location of said solid;

machining, in three-dimensional fashion, a three-dimensional surface within said solid corresponding to said illustration; and shading said three-dimensional surface of said solid according to selected depths of machining.

20. A solid exhibiting a three-dimensional engraved surface, according to the following steps:

scanning, into a processor driven and numerically controlled machining center, data corresponding to a three-dimensional illustration;

projecting, into said solid, said three-dimensional illustration according to a depth of cut per pixel distributed across a selected machining area;

machining, in three-dimensional fashion, a three-dimensional surface within said solid corresponding to said illustration, said step of machining further comprising at least machining a roughing cut in a first direction an subsequently machining a finishing cut in a second direction;

forming at least one recess locating surface on a non-machined surface of said solid;

immersing said machined solid into an oxide bath;

abrading a darkened coating formed by said oxide bath upon said three-dimensional surface and in order to shade said solid according to individual depths of cut;

applying a powderized and plasticized material upon said solid; and baking said powder coated solid in an oven and in order to thermoset said powderized material.

21. A solid exhibiting a three-dimensional engraved surface, according to the following steps:

scanning, into a processor driven and numerically controlled machining center, data corresponding to a three-dimensional illustration;

projecting, into said solid, said three-dimensional illustration according to a depth of cut per pixel distributed across a selected machining area;

machining, in three-dimensional fashion, a three-dimensional surface within said solid corresponding to said illustration, said step of machining further comprising at least machining a roughing cut in a first direction and subsequently machining a finishing cut in a second direction;

securing fastener receiving mounting studs to a non-machined surface of said solid according to a capacitor discharge welding process;

immersing said machined solid into an oxide bath;

abrading a darkened coating formed by said oxide bath upon said three-dimensional surface and in order to shade said solid according to individual depths of cut;

applying a powderized and plasticized material upon said solid; and baking said powder coated solid in an oven and in order to thermoset said powderized material.

* * * * *